US011029166B2

(12) United States Patent
Yang

(10) Patent No.: US 11,029,166 B2
(45) Date of Patent: Jun. 8, 2021

(54) SYSTEMS AND METHODS FOR RESERVING A CARPOOLING SERVICE

(71) Applicant: BEIJING DIDI INFINITY TECHNOLOGY AND DEVELOPMENT CO., LTD., Beijing (CN)

(72) Inventor: Baotong Yang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/744,137

(22) Filed: Jan. 15, 2020

(65) Prior Publication Data
US 2020/0149905 A1     May 14, 2020

Related U.S. Application Data

(63) Continuation of application No. PCT/CN2017/109681, filed on Nov. 7, 2017.

(51) Int. Cl.
*G01C 21/34* (2006.01)
*G06Q 10/02* (2012.01)
(Continued)

(52) U.S. Cl.
CPC ....... *G01C 21/3438* (2013.01); *G01C 21/343* (2013.01); *G06Q 10/02* (2013.01);
(Continued)

(58) Field of Classification Search
CPC ........ G01C 21/34; G06Q 50/30; G06Q 10/02; G06Q 10/04; G06Q 30/02; H04W 4/021
(Continued)

(56) References Cited

U.S. PATENT DOCUMENTS

2004/0267449 A1*  12/2004  Adamczyk ......... G01C 21/3438
                                                                  701/410
2007/0010942 A1*  1/2007  Bill .................... G01C 21/3617
                                                                  701/424
(Continued)

FOREIGN PATENT DOCUMENTS

CA        2975002 A1 *  8/2016  .............. H04W 4/02
CN     104616490 A        5/2015
(Continued)

OTHER PUBLICATIONS

International Search Report in PCT/CN2017/109681 dated Aug. 13, 2018, 4 pages.
(Continued)

*Primary Examiner* — Atul Trivedi
(74) *Attorney, Agent, or Firm* — Metis IP LLC

(57) ABSTRACT

Systems and methods for reserving a carpooling service are provided. A method may include: obtaining, from a first passenger terminal, a first service request including a first start location and a first destination; determining at least one first recommended time based on the first start location and the first destination; obtaining a first start time from the first passenger terminal, the first start time is selected from the at least one first recommended time by the first passenger terminal; obtaining, from a second passenger terminal, a second service request including a second start location and a second destination after the obtaining of the first service request; and determining a second recommended time for the second passenger terminal based on the first start location, the second start location, and the first start time.

20 Claims, 12 Drawing Sheets

(51) Int. Cl.
*G06Q 10/04* (2012.01)
*G06Q 30/02* (2012.01)
*G06Q 50/30* (2012.01)
*H04W 4/021* (2018.01)

(52) U.S. Cl.
CPC ....... *G06Q 10/047* (2013.01); *G06Q 30/0284* (2013.01); *G06Q 50/30* (2013.01); *H04W 4/021* (2013.01)

(58) Field of Classification Search
USPC .......................................... 701/533
See application file for complete search history.

(56) References Cited

U.S. PATENT DOCUMENTS

| | | | | |
|---|---|---|---|---|
| 2014/0074757 A1* | 3/2014 | De Gennaro | .......... | G07B 13/04 705/417 |
| 2015/0241231 A1* | 8/2015 | Abramson | ......... | G01C 21/3446 701/534 |
| 2016/0012461 A1* | 1/2016 | Paul | .................. | G06Q 30/0207 705/5 |
| 2016/0320194 A1* | 11/2016 | Liu | .................... | G01C 21/3423 |
| 2016/0320195 A1* | 11/2016 | Liu | ........................ | G06Q 50/01 |
| 2016/0321566 A1* | 11/2016 | Liu | .................... | G01C 21/3438 |
| 2016/0321771 A1* | 11/2016 | Liu | .................... | G01C 21/3438 |
| 2016/0364678 A1* | 12/2016 | Cao | ........................ | G06Q 50/30 |
| 2016/0364679 A1* | 12/2016 | Cao | ........................ | G06Q 50/30 |
| 2016/0364812 A1* | 12/2016 | Cao | ........................ | G06Q 50/30 |
| 2016/0364823 A1* | 12/2016 | Cao | ........................ | G06Q 50/30 |
| 2017/0059342 A1* | 3/2017 | Rajendran | ............ | H04W 24/02 |
| 2017/0104824 A1* | 4/2017 | Bajwa | .................... | H04W 4/44 |
| 2017/0293950 A1* | 10/2017 | Rathod | ............. | G06Q 30/0639 |

FOREIGN PATENT DOCUMENTS

| | | | | |
|---|---|---|---|---|
| WO | WO-2004013733 A2 * | 2/2004 | ............ | G06Q 10/02 |
| WO | 2017143815 A1 | 8/2017 | | |

OTHER PUBLICATIONS

Written Opinion in PCT/CN2017/109681 dated Aug. 13, 2018, 4 pages.

* cited by examiner

SYSTEMS AND METHODS FOR RESERVING A CARPOOLING SERVICE

CROSS-REFERENCE TO RELATED APPLICATIONS

This application is a continuation of International Application No. PCT/CN2017/109681, filed on Nov. 7, 2017, the contents of which are incorporated herein by reference.

TECHNICAL FIELD

The present disclosure generally relates to systems and methods for providing an online on-demand service, and in particular, to systems and methods for reserving a carpooling service.

BACKGROUND

On-demand transportation services, especially online carpooling services have become more and more popular. When a service requester (e.g., a passenger) sends a carpooling service request to an online service platform, the service requester may choose any time in a day as his/her start time. A problem of the existing technology for reserving a carpooling service is that the start time of two or more service requesters is dispersive, so that it is inefficient to carpool successfully. Accordingly, it is desirable to provide systems and methods for reserving a carpooling service to improve the efficiency of successful carpooling.

SUMMARY

According to an aspect of the present disclosure, a system may include at least one storage medium including a set of instructions for reserving a carpooling service, and at least one processor in communication with the storage medium, wherein when executing the set of instructions, the at least one processor may be directed to: obtain, from a first passenger terminal, a first service request including a first start location and a first destination; determine at least one first recommended time based on the first start location and the first destination; obtain a first start time from the first passenger terminal, wherein the first start time is selected from the at least one first recommended time by the first passenger terminal; obtain, from a second passenger terminal, a second service request including a second start location and a second destination after the obtaining of the first service request; and determine a second recommended time for the second passenger terminal based on the first start location, the second start location, and the first start time.

In some embodiments, to determine the at least one first recommended time based on the first start location and the first destination, the at least one processor is further directed to: obtain a plurality of historical orders; identify a plurality of routes from the plurality of historical orders, wherein each route includes a start location and a destination; for each route, determine a count of historical orders during each predetermined period of time; and for each route, determine at least one first recommended time based on the count of historical orders during each predetermined period of time.

In some embodiments, to determine the second recommended time for the second passenger terminal, the at least one processor is further directed to: determine an estimated driving time from the first start location to the second start location; and determine the second recommended time based on the first start time and the estimated driving time.

In some embodiments, to determine the second recommended time for the second passenger terminal, the at least one processor is further directed to: determine a route similarity between the first passenger terminal and the second passenger terminal; determine that the route similarity is greater than a similarity threshold; and determine the second recommended time based on the first start location, the second start location, and the first start time.

In some embodiments, to determine the route similarity between the first passenger terminal and the second passenger terminal, the at least one processor is further directed to: determine an angle between a first route of the first passenger terminal and a second route of the second passenger terminal; determine a distance difference between a carpooling route and a longer single route, wherein the longer single route is a route with a longer distance between the first route and the second route; and determine the route similarity between the first passenger terminal and the second passenger terminal based on the angle and the distance difference.

In some embodiments, to determine the angle between the first route and the second route, the at least one processor is further directed to: determine a first vector of the first route based on the first start location and the first destination; determine a second vector of the second route based on the second start location and the second destination; and determine an angle between the first vector of the first route and the second vector of the second route.

In some embodiments, to determine the distance difference between the carpooling route and the longer single route, the at least one processor is further directed to: determine a first driving distance of the first route based on the first start location and the first destination; determine a second driving distance of the second route based on the second start location and the second destination; determine a longer single driving distance of the longer single route from the first driving distance and the second driving distance; determine a carpooling driving distance of the carpooling route based on the first start location, the first destination, the second start location, and the second destination; and determine a distance difference between the carpooling driving distance and the longer single driving distance.

In some embodiments, the at least one processor is further directed to: obtain, from a third passenger terminal, a third service request including a third start location and a third destination before the obtaining of the second service request; determine at least one third recommended time based on the third start location and the third destination; obtain a third start time from the third passenger terminal, wherein the third start time is selected from the at least one third recommended time by the third passenger terminal; determine that a route similarity between the second passenger terminal and the third passenger terminal is greater than a similarity threshold; determine a fourth recommended time for the second passenger terminal based on the third start location, the second start location, and the third start time; send the fourth recommended time to the second passenger terminal together with the second recommended time; and receive a second start time selected from the second recommended time and the fourth recommended time from the second passenger terminal.

According to another aspect of the present disclosure, a method for reserving a carpooling service may be implemented on a computing device having at least one processor, at least one computer-readable storage medium, and a communication platform connected to a network. The method may include one or more following operations: obtaining, from a first passenger terminal, a first service request including a first start location and a first destination; determining at least one first recommended time based on the first start location and the first destination; obtaining a first start time from the first passenger terminal, wherein the first start time is selected from the at least one first recommended time by the first passenger terminal; obtaining, from a second passenger terminal, a second service request including a second start location and a second destination after the obtaining of the first service request; and determining a second recommended time for the second passenger terminal based on the first start location, the second start location, and the first start time.

In some embodiments, the determining the at least one first recommended time based on the first start location and the first destination may include one or more following operations: obtaining a plurality of historical orders; identifying a plurality of routes from the plurality of historical orders, wherein each route includes a start location and a destination; for each route, determining a count of historical orders during each predetermined period of time; and for each route, determining at least one first recommended time based on the count of historical orders during each predetermined period of time.

In some embodiments, the determining the second recommended time for the second passenger terminal may include one or more following operations: determining an estimated driving time from the first start location to the second start location; and determining the second recommended time based on the first start time and the estimated driving time.

In some embodiments, the determining the second recommended time for the second passenger terminal may include one or more following operations: determining a route similarity between the first passenger terminal and the second passenger terminal; determining that the route similarity is greater than a similarity threshold; and determining the second recommended time based on the first start location, the second start location, and the first start time.

In some embodiments, the determining the route similarity between the first passenger terminal and the second passenger terminal may include one or more following operations: determining an angle between a first route of the first passenger terminal and a second route of the second passenger terminal; determining a distance difference between a carpooling route and a longer single route, wherein the longer single route is a route with a longer distance between the first route and the second route; and determining the route similarity between the first passenger terminal and the second passenger terminal based on the angle and the distance difference.

In some embodiments, the determining the angle between the first route and the second route may include one or more following operations: determining a first vector of the first route based on the first start location and the first destination; determining a second vector of the second route based on the second start location and the second destination; and determining an angle between the first vector of the first route and the second vector of the second route.

In some embodiments, the determining the distance difference between the carpooling route and the longer single route may include one or more following operations: determining a first driving distance of the first route based on the first start location and the first destination; determining a second driving distance of the second route based on the second start location and the second destination; determining a longer single driving distance of the longer single route from the first driving distance and the second driving distance; determining a carpooling driving distance of the carpooling route based on the first start location, the first destination, the second start location, and the second destination; and determining a distance difference between the carpooling driving distance and the longer single driving distance.

In some embodiments, the method may further include one or more following operations: obtaining, from a third passenger terminal, a third service request including a third start location and a third destination before the obtaining of the second service request; determining at least one third recommended time based on the third start location and the third destination; obtaining a third start time from the third passenger terminal, wherein the third start time is selected from the at least one third recommended time by the third passenger terminal; determining that a route similarity between the second passenger terminal and the third passenger terminal is greater than a similarity threshold; determining a fourth recommended time for the second passenger terminal based on the third start location, the second start location, and the third start time; sending the fourth recommended time to the second passenger terminal together with the second recommended time; and receiving a second start time selected from the second recommended time and the fourth recommended time from the second passenger terminal.

According to still another aspect of the present disclosure, a non-transitory computer readable medium, comprising at least one set of instructions for reserving a carpooling service, wherein when executed by at least one processor of a computer device, the at least one set of instructions directs the at least one processor to: obtain, from a first passenger terminal, a first service request including a first start location and a first destination; determine at least one first recommended time based on the first start location and the first destination; obtain a first start time from the first passenger terminal, wherein the first start time is selected from the at least one first recommended time by the first passenger terminal; obtain, from a second passenger terminal, a second service request including a second start location and a second destination after the obtaining of the first service request; and determine a second recommended time for the second passenger terminal based on the first start location, the second start location, and the first start time.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
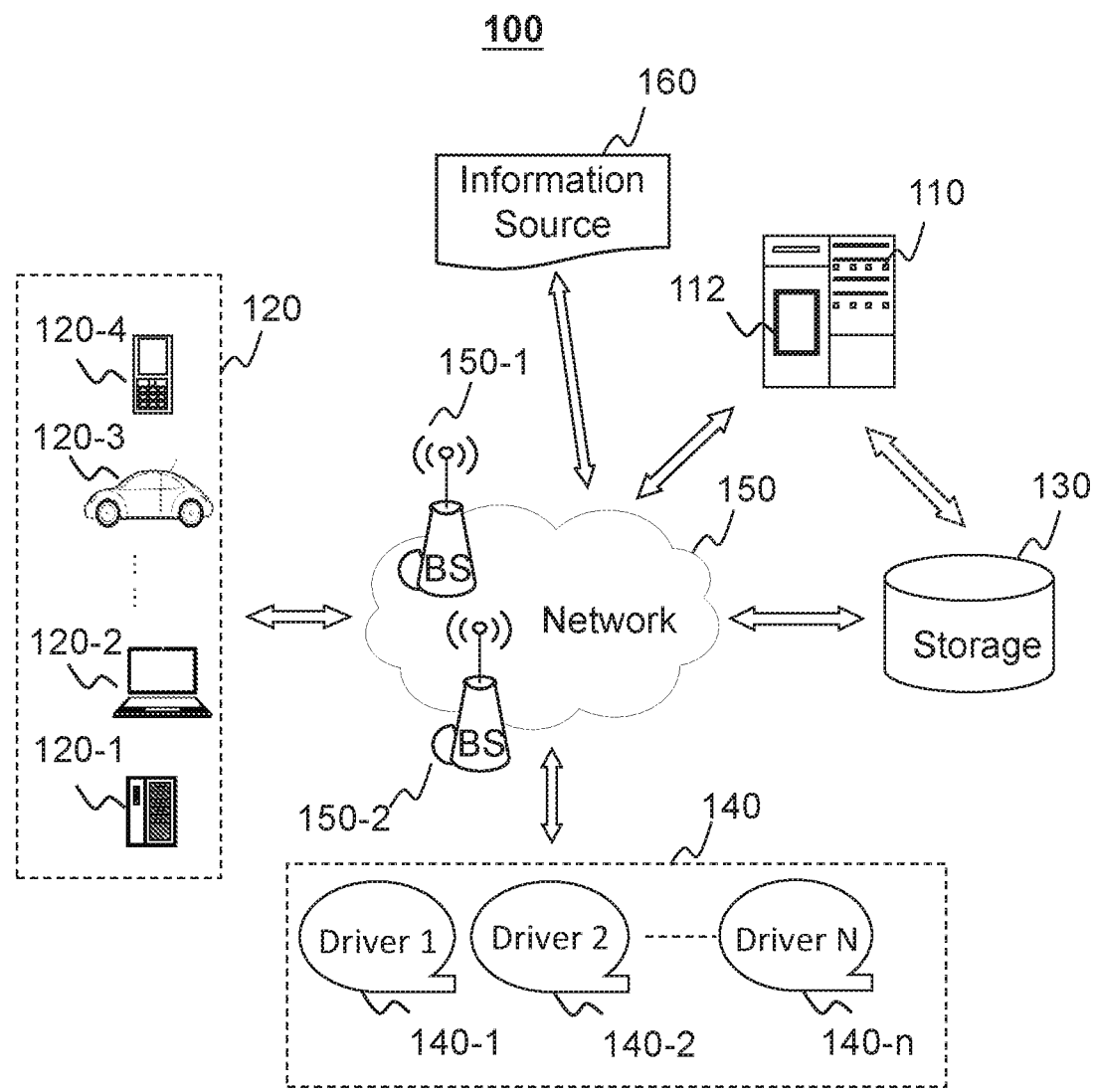
FIG. 1 is a block diagram of an exemplary system for reserving a carpooling service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the system and method in the present disclosure is described primarily in regard to online car hailing services, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "carpooling" in the present disclosure refers to a sharing of journeys so that more than one person travels in a car. In the present disclosure, the carpooling service may refer to a service that more than one passengers request for sharing journeys and call for a vehicle. The carpooling service may also refer to a service that a driver wants to share his/her vehicle with at least one passenger during the journey.

The position and/or trace in the present disclosure may be acquired by positioning technology embedded in a user terminal (e.g., a passenger terminal, a driver terminal). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning technologies may be used interchangeably in the present disclosure.

An aspect of the present disclosure relates to online systems and methods for reserving a carpooling service. According to the present disclosure, the systems and methods may predetermine at least one start time for a route, and recommend the at least one start time to an earlier passenger who hails a car and wants to share the car with others along the route. The systems and methods may also determine a start time for a later passenger who also hails a car and wants to share the car with others along the route based on the start time that the earlier passenger selects, and an estimated driving time from a start location of the earlier passenger to a start location of the later passenger. According to the present disclosure, the systems and methods may recommend a plurality of start times for the later passenger, each start time may correspond to an earlier passenger. The later passenger may select a start time from the plurality of recommended start times to carpool with the corresponding earlier passenger.

FIG. 1 is a block diagram of an exemplary system 100 for reserving a carpooling service according to some embodiments of the present disclosure. For example, the system 100 may be an online transportation service platform for transportation services such as car hailing services, chauffeur services, vehicle delivery services, carpooling services, bus services, driver hiring services, and shuttle services, etc. The system 100 may include a server 110, a passenger terminal 120, a storage 130, a driver terminal 140, a network 150 and an information source 160. The server 110 may include a processing engine 112.

The server 110 may be configured to process information and/or data relating to a carpooling service. For example, the server 110 may receive a plurality of carpooling service requests from the passenger terminals 120, and process the requests to recommend a start time for each passenger terminal 120, respectively. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the passenger terminal 120, the driver terminal 140 and/or the storage 130 via the network 150. As another example, the server 110 may be directly connected to the passenger terminal 120, the driver terminal 140 and/or the storage 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the carpooling service to perform one or more functions described in the present disclosure. For example, the processing engine 112 may receive a plurality of carpooling service requests from the passenger terminals 120, and process the requests to recommend a start time for each passenger terminal 120, respectively. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the passenger terminal 120 and/or the driver terminal 140 may be an individual, a tool or other entity directly relating to the carpooling service. A passenger may be a service requester. In the present disclosure, "service requester", "passenger terminal" and "passenger" may be used interchangeably. A driver may be a service provider. In the present disclosure, "driver," "driver terminal", and "service provider" may be used interchangeably. In some embodiments, the passenger terminal 120 may include a mobile device 120-1, a tablet computer 120-2, a laptop computer 120-3, and a built-in device 120-4 in a motor vehicle, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the built-in device in the motor vehicle 120-4 may include an onboard computer, an onboard television, etc. In some embodiments, the passenger terminal 120 may be a device with positioning technology for locating the position of the passenger and/or the passenger terminal 120.

In some embodiments, the driver terminal 140 may be similar to, or the same device as the passenger terminal 120. In some embodiments, the driver terminal 140 may be a device with positioning technology for locating the position of the driver and/or the driver terminal 140. In some embodiments, the passenger terminal 120 and/or the driver terminal 140 may communicate with another positioning device to determine the position of the passenger, the passenger terminal 120, the driver, and/or the driver terminal 140. In some embodiments, the passenger terminal 120 and/or the driver terminal 140 may transmit positioning information to the server 110.

The storage 130 may store data and/or instructions relating to the carpooling service. In some embodiments, the storage 130 may store data obtained/acquired from the passenger terminal 120 and/or the driver terminal 140. In some embodiments, the storage 130 may store data and/or instructions that the server 110 may execute or use to perform exemplary methods described in the present disclosure. In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 130 may be connected to the network 150 to communicate with one or more components in the system 100 (e.g., the server 110, the passenger terminal 120, the driver terminal 140). One or more components in the system 100 may access the data or instructions stored in the storage 130 via the network 150. In some embodiments, the storage 130 may be directly connected to or communicate with one or more components in the system 100 (e.g., the server 110, the passenger terminal 120, the driver terminal 140, etc.). In some embodiments, the storage 130 may be part of the server 110.

The network 150 may facilitate exchange of information and/or data. In some embodiments, one or more components in the system 100 (e.g., the server 110, the passenger terminal 120, the storage 130, and the driver terminal 140) may send and/or receive information and/or data to/from other component(s) in the system 100 via the network 150. For example, the server 110 may obtain/acquire orders from the passenger terminals 120 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra-wide band (UWB) network, an infrared ray, or the like, or any combination thereof. In some embodiments, the system 100 may include one or more network access points. For example, the system 110 may include wired or wireless network access points such as base stations and/or wireless access points 150-1, 150-2, . . . , through which one or more components of the system 100 may be connected to the network 150 to exchange data and/or information.

The information source 160 may be a source configured to provide other information for the system 100. The information source 160 may provide the system 100 with service information, such as weather conditions, traffic information, information of laws and regulations, news events, life information, life guide information, or the like, or any combination thereof. The information source 160 may be implemented in a single central server, multiple servers connected via a communication link, or multiple personal devices. When the information source 160 is implemented in multiple personal devices, the personal devices can generate content (e.g., as referred to as the "user-generated content"), for example, by uploading text, voice, image and video to a cloud server. An information source may be generated by the multiple personal devices and the cloud server.

Figure 2:
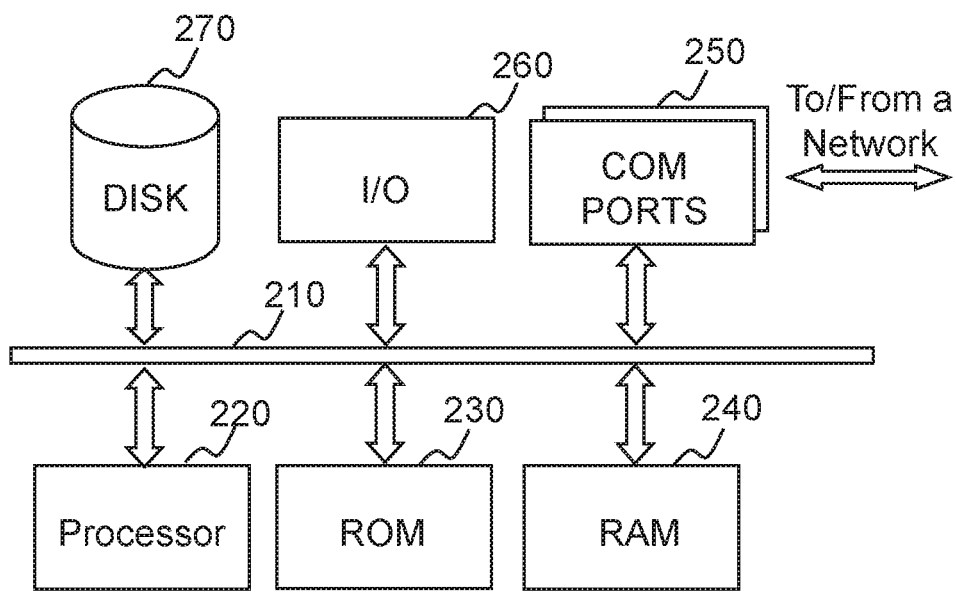
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the passenger terminal 120, the storage 130, the driver 140 and/or the information source 160 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the system 100 as described herein. In FIGS. 1-2, only one such computer device is shown purely for convenience purposes. One of ordinary skill in the art would understood at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
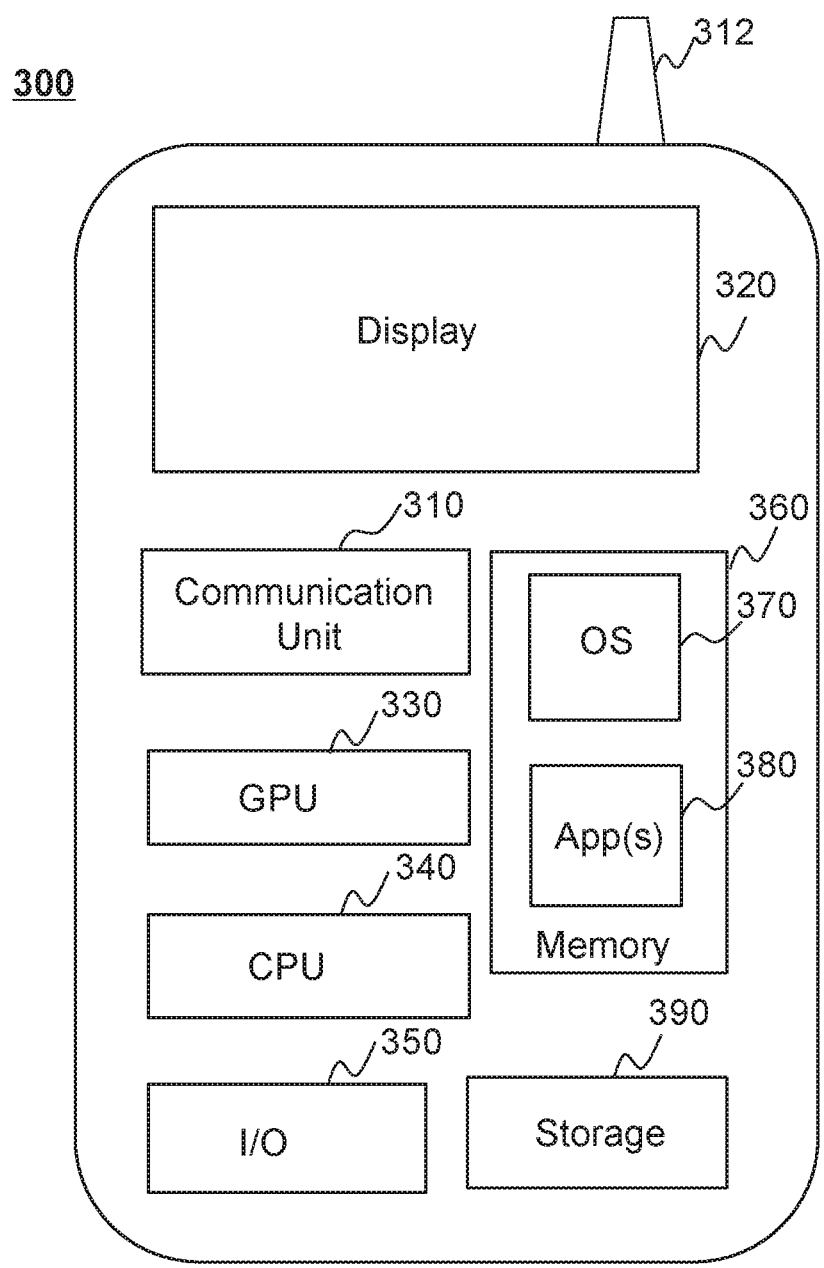
FIG. 3 is schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the passenger terminal 120 or the provider terminal 140 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, a storage 390, and an antenna 312. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, ANDROID™, Windows Phone™, etc.) and one or more applications 380 may be loaded into the memory 360 from the storage 390 in order to be executed by the CPU 340. The applications 380 may include a browser or any other suitable mobile apps for receiving and sending information relating to a carpooling service request or other information from the location based service providing system on the mobile device 300. User interactions with the information stream may be achieved via the I/O devices 350 and provided to the processing engine 112 and/or other components of the system 100 via the network 120. The antenna 312 may be configured to send radio signals to other devices and/or receive radio signal from other devices.

In order to implement various modules, units and their functions described above, a computer hardware platform may be used as hardware platforms of one or more elements (e.g., a module of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
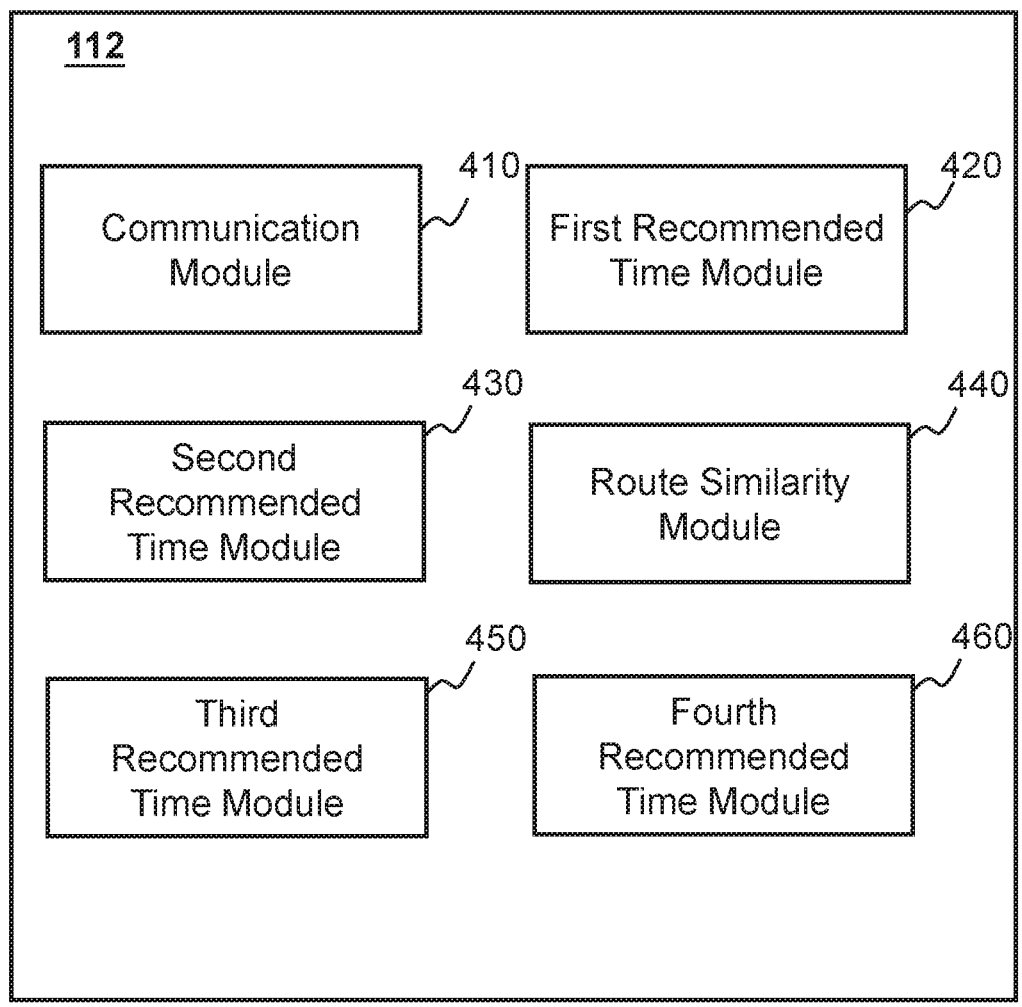
FIG. 4 is a block diagram illustrating an exemplary processing engine according to some embodiments of the present disclosure.

FIG. 4 is a block diagram illustrating an exemplary processing engine 112 according to some embodiments. The processing engine 112 may include a communication module 410, a first recommended time module 420, a second recommend time module 430, a route similarity module 440, a third recommended time module 450, and a fourth recommended time module 460. Each, part, of all of the modules may be hardware circuits of all or part of the processing engine 112. Each, part, of all of the modules may also be implemented as an application or a set of instructions read and executed by the processing engine. Further, the modules may be any combination of the hardware circuits and the application/instructions. For example, the modules may be the part of the processing engine 112 when the processing engine is executing the application/set of instructions.

The communication module 410 may be configured to receive, obtain, and/or send information and/or data relating to the carpooling service from and/or to one or more other components in the system 100. For example, the communication module 410 may be configured to receive a service request (e.g., a first service request, a second service request, a third service request, etc.) from a passenger terminal (e.g., a first passenger terminal, a second passenger terminal, a third passenger terminal, etc.). As another example, the communication module 410 may configured to receive a start time selected by the passenger terminal. As still another example, the communication module 410 may be configured to send at least one recommended time to a passenger terminal.

The first recommended time module 420 may be configured to determine at least one first recommended time for the first passenger terminal. For example, the first recommended time module 420 may obtain a plurality of historical orders, identify a plurality of routes from the plurality of historical orders, determine a count of historical orders during each predetermined period of time for each route, and determine the at least one first recommended time for each route based on the count of historical orders.

The second recommend time module 430 may be configured to determine a second recommended time for the second passenger terminal. For example, the second recommend time module 430 may determine an estimated driving time from a first start location of the first passenger terminal to a second start location of the second passenger terminal, and determine the second recommended time based on the first start time that the first passenger terminal selected and the estimated driving time.

The route similarity module 440 may be configured to determine a route similarity between two passenger terminals (e.g., between the first passenger terminal and the second passenger terminal, between the second passenger terminal and the third passenger terminal), and/or determine whether the route similarity is larger than a similarity threshold. For example, the route similarity module 440 may determine an angle between the first route and the second route to determine the route similarity. As another example, the route similarity module 440 may determine a distance difference between a carpooling route and a longer single route between the first route and the second route to determine the route similarity.

The third recommended time module 450 may be configured to determine at least one third recommended time. For example, the third recommended time module 450 may obtain a plurality of historical orders, identify a plurality of routes from the plurality of historical orders, determine a count of historical orders during each predetermined period of time for each route, and determine the at least one third recommended time for each route based on the count of historical orders.

The fourth recommended time module 460 may be configured to determine a fourth recommended time for the second passenger terminal. For example, the fourth recommended time module 460 may determine an estimated driving time from a third start location of the third passenger terminal to the second start location of the second passenger terminal, and determine the fourth recommended time based on the third start time that the third passenger terminal selected and the estimated driving time.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the first recommended time module 420, the second recommend time module 430, the third recommended time module 450, and the fourth recommended time module 460 may be integrated in a recommended time module as a single module that may determine the first recommended time, the second recommended time, the third recommended time, and the fourth recommended time. As another example, the communication module 410 may be divided into two units of a receiving unit and a sending unit to implement the functions of the communication module 410, respectively.

Figure 5:
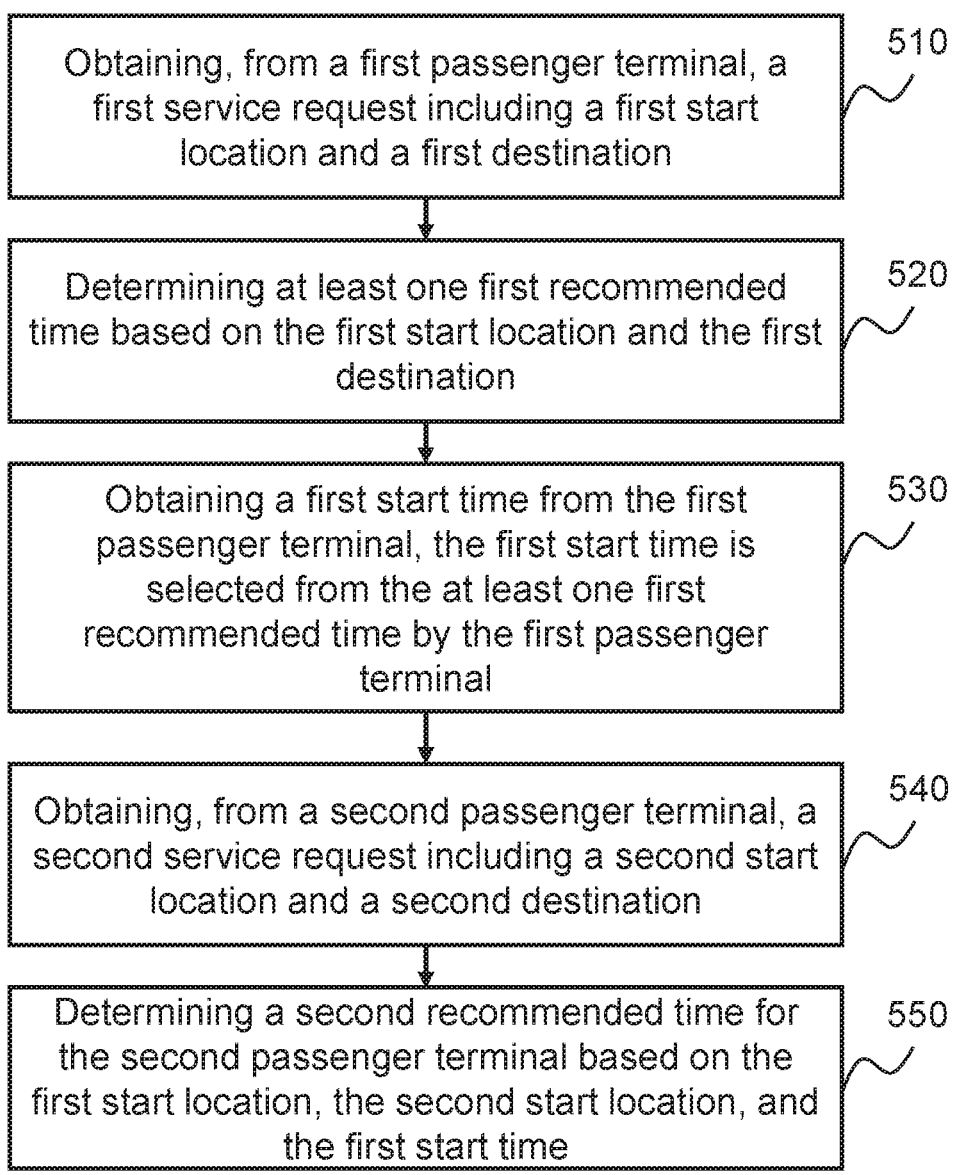
FIG. 5 is a flowchart illustrating an exemplary process and/or method for reserving a carpooling service according to some embodiments of the present disclose.

FIG. 5 is a flowchart of an exemplary process and/or method 500 for reserving a carpooling service according to some embodiments of the present disclose. In some embodiments, one or more steps in the process 500 may be implemented in the system 100 illustrated in FIG. 1. For example, one or more steps in the process 500 may be stored in the storage (e.g., the storage 130, the ROM 230, the RAM 240, etc.) as a form of at least one set of instructions, and invoked and/or executed by the server 110 (e.g., the processing engine 112 in the server 110, or the processor 220 of the processing engine 112 in the server 110). In some embodiments, one or more steps in the process 500 may be stored as at least one set of instructions in a non-transitory computer readable medium embodying a computer program product. In some embodiments, the instructions may be transmitted in a form of electronic current or electrical signals. The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the processor 220 (or the communication module 410) may receive a first service request from a first passenger terminal. In some embodiments, the first service request may be a taxi hailing request that accept carpool option, a public transportation service (e.g., a bus service), and/or a goods delivery service request etc. For illustration purpose, the present disclosure uses a carpool service as an example.

The first service request may include a first start location, a first destination, a first user identifier of the first passenger terminal, a first request time, a first position where the first passenger terminal sends the first service request, a vehicle type that the first passenger terminal requests, or the like, or any combination thereof.

In some embodiments, the service request may refer to a carpooling intent that a passenger initiates in an online transportation platform. For example, when a passenger opens a transportation service application installed in a passenger terminal, connects the passenger terminal to the online on-demand transportation platform 100, and inputs his/her start location and destination for reserving a carpooling service via the application, the passenger terminal may send a service request to the server of the platform 100 via the network 150. The processor 220 may receive the service request including the start location and the destination from the passenger terminal.

In some embodiments, the first passenger terminal may be used by an earlier passenger (also refers to as a first passenger) who inputs his/her start location and destination earlier than other passengers to reserve a carpooling service associated with his/her start location and destination (e.g., the routes and/or driving paths are same or similar so that the passengers may share a vehicle together). The first service request may refer to the corresponding carpooling request from the first passenger terminal, and the first start location and the first destination may refer to the corresponding start location and destination in the first service request, respectively.

In 520, the processor 220 (or the first recommended time module 420) may determine at least one first recommended time based on the first start location and the first destination.

In some embodiments, the processor 220 may identify a plurality of routes from a plurality of historical orders, and predetermine at least one first recommended time for each route. In some embodiments, a route in the present disclosure may include a start location and a destination. For example, "Beijing to Tianjin" may be a route that connects the city Beijing and the city Tianjin. Since there may have one or more than one driving path between Beijing and Tianjin, the term "route" here may refer to a specific driving path between Beijing and Tianjin. Alternatively, the term "route" may generally refer to the whole set of any driving path that connects Beijing and Tianjin, without specifying or even including a particular driving path. For illustration purpose only, the present disclosure takes the general referring of the set of driving paths connecting Beijing and Tianjin as an example. In some embodiments, the processor 220 (or the first recommended time module 420) may identify a target route based on the first start location and the first destination, and then determined at least one first recommended time of the target route from the plurality of routes and the at least one corresponding predetermined first recommended time. In some embodiments, a first recommended time may include a moment or a period of time. In some embodiments, the method and/or process for determining at least one first recommended time for each route may be found in connection with FIG. 6 and the description thereof in the present disclosure.

In some embodiments, the processor 220 (or the first recommended time module 420) may determine the at least one first recommended time based on a plurality of historical orders, the first start location, and the first destination. For example, the processor 220 (or the first recommended time module 420) may determine a target route based on the first start location and the first destination. The processor 220 (or the first recommended time module 420) may identify a plurality of historical orders associated with the target route, and determine a count of the plurality of historical orders associated with the target route during each predetermined period of time. In some embodiments, the predetermined period of time may be determined by the system 100 according to different application scenarios. For example, the predetermined period of time may be determined based on different routes. As another example, the predetermined period of time may be a preset value stored in a storage (e.g., the storage 130, the ROM 230, the RAM 240, etc.) of the system 100. As still another example, the predetermined period of time may be determined based on the vehicle type that the first passenger terminal selects. Merely by way of example, the predetermined period of time may include every thirty minutes, every hour, every two hours, a period of time of rush hours (e.g., from 7:30 am-9:00 am, from 17:00 pm to 18:00 pm, etc.), or the like, or any combination thereof. In some embodiments, the processor 220 (or the first recommended time module 420) may determine the at least one first recommended time for the target route based on the count of the plurality of historical orders associated with the target route during each predetermined period of time. For example, the processor 220 (or the first recommended time module 420) may select at least one moment and/or at least one period of time at or during which the counts of historical orders of the target route are the maximum, and determine the at least one moment and/or the at least one period of time as the at least one first recommended time. As another example, for a route "city Beijing to city Tianjin", the processor 220 (or the first recommended time module 420) may first calculate a count of historical orders during every hour. Then the processor 220 (or the first recommended time module 420) may select several maximum counts and the corresponding periods of time and/or the corresponding moments, and determine the corresponding periods of time and/or the corresponding moments as the at least one first recommended time.

In 530, the processor 220 (or the communication module 410) may obtain and/or receive a first start time from the first passenger terminal. The first start time is selected from the at least one first recommended time by the first passenger terminal, and then the first passenger terminal may send the selected first start time to the processor 220 (or the communication module 410) via wireless communication signal.

In some embodiments, after determining the at least first recommended time, the processor 220 (or the communication module 410) may send the at least one first recommended time to the first passenger terminal via the network 150, then the first passenger of the first passenger terminal may select the first start time from the at least first recommended time as his/her start time for starting the carpooling service. The first passenger terminal may then receive the selection, and send the first start time to the processor 220 (or the communication module 410) via the network 150.

In 540, the processor 220 (or the communication module 410) may receive a second service request from a second passenger terminal. In some embodiments, the second service request may include a second start location, a second destination, a second user identifier of the second passenger terminal, a second request time, a second position where the second passenger terminal sends the second service request, a vehicle type that the second passenger terminal requests, or the like, or any combination thereof.

In some embodiments, the second passenger terminal may be used by a later passenger (also refers to as a second passenger) who inputs his/her start location and destination later than the first passenger to reserve a carpooling service associated with his/her start location and destination (e.g., the routes and/or driving paths are same or similar so that the first passenger and the second passenger may share a vehicle together). The second service request may refer to the corresponding carpooling request from the second passenger terminal, and the second start location and the second destination may refer to the corresponding start location and destination in the second service request, respectively.

In 550, the processor 220 (or the second recommended time module 430) may determine a second recommended time for the second passenger terminal based on the first start location, the second start location, and the first start time.

In some embodiments, the second recommended time may refer to a second start time (the time when the second passenger terminal starts the carpooling service) of the second passenger that the system 100 recommends to the second passenger (via the second passenger terminal) if the first passenger and the second passenger terminal may carpool together. In some embodiments, after determining the second recommended time, the processor 220 (or the communication module 410) may send the second recommended time to the second passenger terminal via the network 150. Then after the second passenger confirms the second recommended time as his/her start time, the processor 220 may generate a carpooling order, and send the carpooling order to the first passenger terminal, the second passenger terminal, and a driver terminal that registered in the online transportation platform before the carpooling service begins.

In some embodiments, the processor 220 (or the second recommended time module 430) may determine an estimated driving time that a driver may cost when driving from the first start location to the second start location at the first start time. In some embodiments, the second recommended time may be a time after the estimated driving time from the first start time. In some embodiments, the processor 220 may determine the estimated driving time based on a floating premium algorithm, an automatic matching algorithm, a dispatch optimization algorithm, or the like, or any combination thereof. In some embodiments, the method and/or processor for determining the second recommended time may be found in connection with FIG. 7 and the description thereof in the present disclosure.

Figure 6:
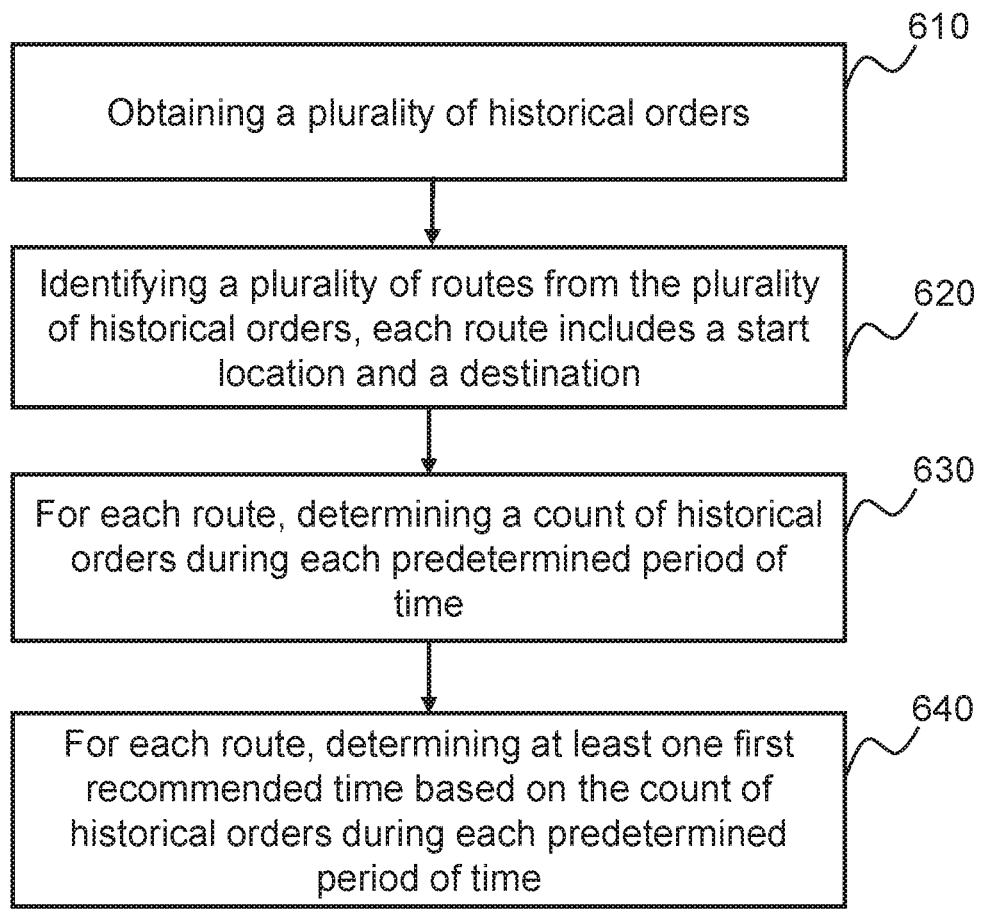
FIG. 6 is a flowchart illustrating an exemplary process and/or method for determining at least one first recommended time for each route according to some embodiments of the present disclose.

FIG. 6 is a flowchart of an exemplary process and/or method 600 for determining at least one first recommended time for each route according to some embodiments of the present disclose. In some embodiments, one or more steps in the process 600 may be implemented in the system 100 illustrated in FIG. 1. For example, one or more steps in the process 600 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 600 may be stored as at least one set of instructions in a non-transitory computer readable medium embodying a computer program product. In some embodiments, the instructions may be transmitted in a form of electronic current or electrical signals. The operations of the illustrated process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In 610, the processor 220 (or the first recommended time module 420) may obtain a plurality of historical orders. A historical order may be a completed historical transportation transaction between a driver and a passenger. Accordingly, in some embodiments, the historical order may include a start location, a destination, a start time, a driving path of the historical order, a driving distance of the historical order, a driving time of the historical order, a vehicle type, at least one user identifier of at least one passenger terminal, a user identifier of a driver passenger terminal, or the like, or any combination thereof.

In some embodiments, the processor 220 (or the first recommended time module 420) may obtain the plurality of historical orders from a storage (e.g., the storage 130, the ROM 230, the RAM 240, etc.) of the system 100. In some embodiments, the plurality of historical orders may refer to the orders that are initiated in the online transportation platform and have completed in a predetermined past period of time (e.g., the last year, the last three months, the last month, the last ten days, etc.). In some embodiments, the plurality of historical orders may include orders of different service types and/or different vehicle types. For example, the plurality of historical orders may include historical car hailing service orders, historical carpooling service orders, historical bus service orders, historical shuttle service orders, historical taxi orders, historical private car service orders, or the like, or any combination thereof.

In 620, the processor 220 (or the first recommended time module 420) may identify a plurality of routes from the plurality of historical orders. In some embodiments, each route may include a start location and a destination. Since each historical order includes a start location, a destination, and a driving path that a driver took to send a passenger from the start location to the destination, the processor 220 may extract the start location and the destination from the historical order to identify the route. In some embodiments, the term "route" may refer to a name including a start location and a destination, for example, "city Beijing to city Tianjin".

In some embodiments, the processor 220 may classify the plurality of historical orders into a plurality of routes according to an administrative region (e.g., province, city, district, town, village, street, etc.), a certain location (e.g., a stadium, a shopping mall, an office district, etc.), or the like, or any combination thereof. For example, the historical orders between two cities (e.g., from anywhere of city A to anywhere of city B) may be classified into one route (e.g., route "city A to city B"). As another example, the historical order between two certain location (e.g., from anywhere in and/or around Zhongguancun to anywhere in and/or around Wangfujing) may be classified into one route (e.g., route "Zhongguancun to Wangfujing"). In some embodiments, a route may include at least one historical orders. A historical order may correspond to at least one route.

In 630, for each route, the processor 220 (or the first recommended time module 420) may determine a count of historical orders during each predetermined period of time.

In some embodiments, the predetermined period of time may be determined by the system according to different application scenarios. For example, the predetermined period of time may be determined based on different routes. As another example, the predetermined period of time may be a preset value stored in a storage (e.g., the storage 130, the ROM 230, the RAM 240, etc.) of the system 100. As still another example, the predetermined period of time may be determined based on the vehicle type that the first passenger terminal selects. Merely by way of example, the predetermined period of time may include every minute, every thirty minutes, every hour, every two hours, a period of time of rush hours (e.g., from 7:30 am-9:00 am, from 17:00 pm to 18:00 pm, etc.), or the like, or any combination thereof.

In some embodiments, the count of historical orders associated with a route may refer to how many passengers registered in the online transportation platform that have traveled along and/or around the route. The count of historical orders associated with a route may also indicate that how many passengers will travel along and/or around the route in the further.

In 640, for each route, the processor 220 (or the first recommended time module 420) may determine at least one first recommended time based on the count of historical orders during each predetermined period of time.

In some embodiments, the processor 220 (or the first recommended time module 420) may determine that whether the count of historical orders during each predetermined period of time for each route is greater than a count threshold. In response to determining that the count of historical orders during a predetermined period of time for a route is greater than the count threshold, the processor 220 (or the first recommended time module 420) may select at least one moment and/or at least one period of time from the corresponding predetermined period of time as the at least one first recommended time for the corresponding route. In some embodiments, the count threshold may be determined by the system 100 according to different application scenarios (e.g., different routes, different vehicle type that the first passenger terminal selects, etc.). In some embodiments, the count threshold be a predetermined certain value stored in a storage (e.g., the storage 130, the ROM 230, the RAM 240, etc.) of the system 100.

In some embodiments, the processor 220 (or the first recommended time module 420) may determine a rank based on the count of historical orders during each predetermined period of time for each route. The processor 220 (or the first recommended time module 420) may select at least one maximum count from the rank, and determine at least one moment and/or at least one period of time from the at least one corresponding predetermined period of time as the at least one first recommended time for each route.

Figure 7:
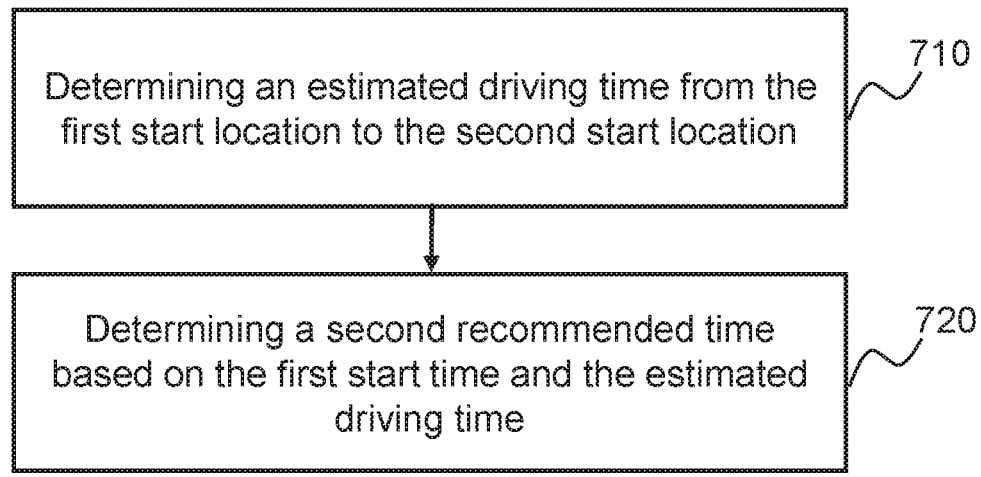
FIG. 7 is a flowchart illustrating an exemplary process and/or method for determining a second recommended time according to some embodiments of the present disclose.

FIG. 7 is a flowchart of an exemplary process and/or method 700 for determining a second recommended time according to some embodiments of the present disclose. In some embodiments, one or more steps in the process 700 may be implemented in the system 100 illustrated in FIG. 1. For example, one or more steps in the process 700 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 700 may be stored as at least one set of instructions in a non-transitory computer readable medium embodying a computer program product. In some embodiments, the instructions may be transmitted in a form of electronic current or electrical signals. The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 710, the processor 220 (or the second recommended time module 430) may determine an estimated driving time from the first start location to the second start location.

In some embodiments, the estimated driving time may refer to an estimated driving time that a driver may cost when driving from the first start location to the second start location (to pick up another passenger or goods, for example) at the first start time. In some embodiments, the estimated driving time may be calculated based on the first start location, the second start location, the first start time, a driving distance, a traffic condition of the driving path, a weather condition, a special event (e.g., a holiday, a concert around, etc.), or the like, or any combination thereof. For example, the driving time from the first start location to the second start location may vary, depending on which driving path a driver takes and the traffic condition of the driving path at the time of departure. Weather condition may also be a factor to affect the driving time. Accordingly, the processor 220 may take the processor may determine the estimated driving time, taking part or all conceivable factors in consideration.

In 720, the processor 220 (or the second recommended time module 430) may determine a second recommended time based on the first start time and the estimated driving time.

The second recommended time may be a time that the driver may arrive the second start location. For example, the driver may arrive at the first start location to pick up the first passenger at the first start time, and after driving the estimated driving time, the driver may arrive at the second start location to pick up the second passenger at the second recommended time.

Figure 8:
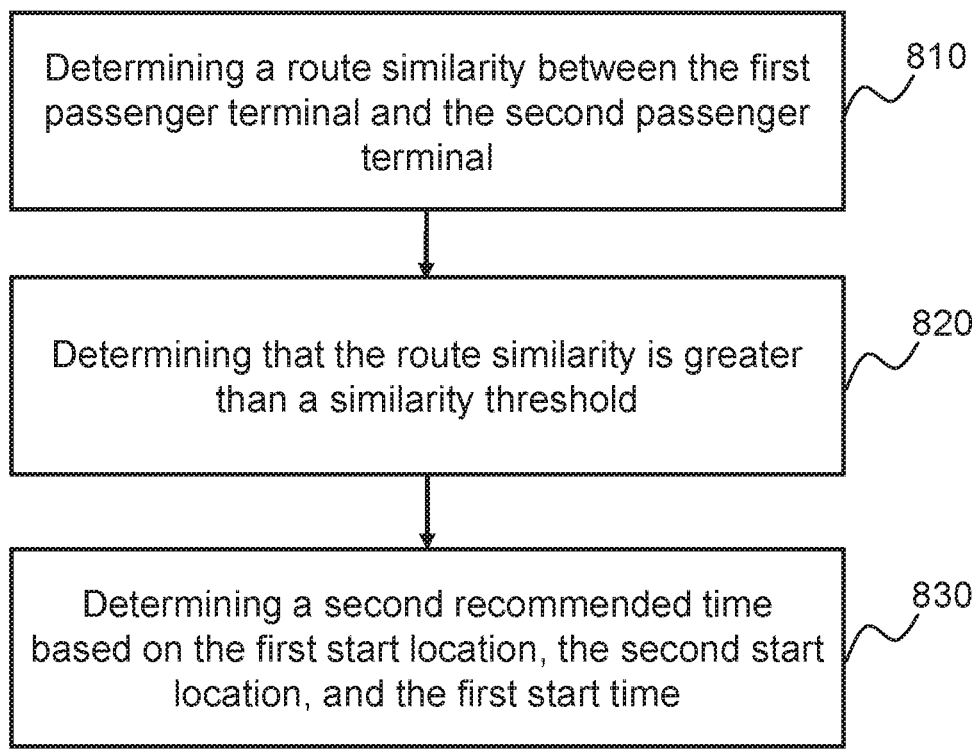
FIG. 8 is a flowchart illustrating an exemplary process and/or method for determining a second recommended time according to some embodiments of the present disclose.

FIG. 8 is a flowchart of an exemplary process and/or method 800 for determining a second recommended time according to some embodiments of the present disclose. In some embodiments, one or more steps in the process 800 may be implemented in the system 100 illustrated in FIG. 1. For example, one or more steps in the process 800 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 800 may be stored as at least one set of instructions in a non-transitory computer readable medium embodying a computer program product. In some embodiments, the instructions may be transmitted in a form of electronic current or electrical signals. The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, the processor 220 (or the route similarity module 440) may determine a route similarity between the first passenger terminal and the second passenger terminal.

In some embodiments, the route similarity between the first passenger terminal and the second passenger terminal may refer to a similar degree between the first route of the request sent from the first passenger terminal and the second route of the request sent from the second passenger terminal. The route similarity may be a value between zero and one. The greater the router similarity is, the more similar that the first route and the second route may be. In some embodiments, the processor 220 (or the route similarity module 440) may determine the route similarity based on an angle between the first route of the first passenger terminal and the second route of the second passenger terminal, a distance difference between a carpooling route and a longer single route between the first route and the second route, or the like, or any combination thereof. Here, the direction of a route may be a vector pointing from the start location to the destination of the route (e.g., pointing from Beijing to Tianjin), and the angle may be an angle between the vector of the first route and the vector of the second route.

For example, the processor 220 (or the route similarity module 440) may calculate the route similarity according to an algorithm and/or a formula associated with the angle between the first passenger terminal and the second passenger terminal and the distance difference between the carpooling route and the longer single route between the first route and the second route. As another example, the processor 220 (or the route similarity module 440) may calculate the route similarity according to an algorithm and/or a formula associated with the angle. As still another example, the processor 220 (or the route similarity module 440) may calculate the route similarity according to an algorithm and/or a formula associated with the distance difference. In some embodiments, the method and/or process for determining the route similarity may be found in connection with FIG. 9 and the description thereof in the present disclosure.

In 820, the processor 220 (or the route similarity module 440) may determine that the route similarity is greater than a similarity threshold.

In some embodiments, the similarity threshold may be determined by the system 100 according to different application scenarios (e.g., different routes, different vehicle type, etc.). In some embodiments, the similarity threshold may be a value between 0 and 1. For example, the similarity threshold may be a value between 0.5 and 1. As another example, the similarity threshold may be a value between 0.7 and 1. In some embodiments, the similarity threshold may be a preset value stored in a storage (e.g., the storage 130, the ROM 230, the RAM 240, etc.) of the system 100. The similarity threshold may be manually preset. Alternatively, the similarity threshold may be automatically set by the system 100 through machine learning through big data collected from historical order data.

In 830, the processor 220 (or the second recommended time module 430) may determine a second recommended time based on the first start location, the second start location, and the first start time.

In some embodiments, in response to determining that the route similarity is greater than the similarity threshold, the processor 220 (or the second recommended time module 430) may determine the second recommended time based on the first start location, the second start location, and the first start time. For example, the processor 220 (or the second recommended time module 430) may first calculate an estimated driving time that a driver may cost when driving from the first start location to the second start location at the first start time. Then the processor 220 (or the second recommended time module 430) may calculate a time after the estimated driving time from the first start time as the second recommended time.

In some embodiments, in response to determining that the route similarity is not greater than the similarity threshold, the processor 220 (or the second recommended time module 430) may determine at least one second recommended time based on the second start location and the second destination. In some embodiments, in response to determining that the route similarity is not greater than the similarity threshold, the determining of the at least one second recommended time may be found in connection with FIG. 6 and the description thereof in the present disclosure.

Figure 9:
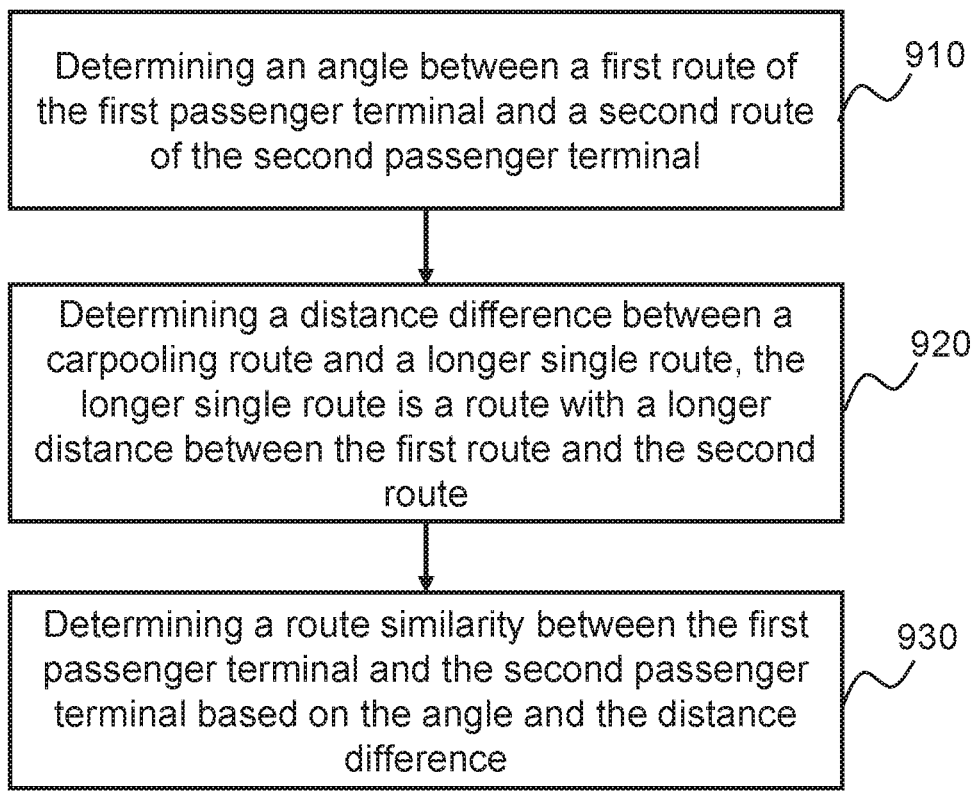
FIG. 9 is a flowchart illustrating an exemplary process and/or method for determining a route similarity between a first passenger terminal and a second passenger terminal according to some embodiments of the present disclose.

FIG. 9 is a flowchart of an exemplary process and/or method 900 for determining a route similarity between a first passenger terminal and a second passenger terminal according to some embodiments of the present disclose. In some embodiments, one or more steps in the process 900 may be implemented in the system 100 illustrated in FIG. 1. For example, one or more steps in the process 900 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 900 may be stored as at least one set of instructions in a non-transitory computer readable medium embodying a computer program product. In some embodiments, the instructions may be transmitted in a form of electronic current or electrical signals. The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the processor 220 (or the route similarity module 440) may determine an angle between a first route of the first passenger terminal and a second route of the second passenger terminal.

In some embodiments, the first route may be a vector (the magnitude of vector is the distance between the first start location and the first destination, and the direction of the vector is from the first start location to the first destination), and the second route may be a vector (the magnitude of vector is the distance between the second start location and the second destination, and the direction of the vector is from the second start location to the second destination). The processor 220 (or the route similarity module 440) may calculate an angle the two vectors as the angle between the first route and the second route. For example, the angle between the first route and the second route may be calculated based on the magnitudes and the directions of the two vectors.

In some embodiments, the first route may include a plurality of straight segments (the plurality of straight segments may connect the first start location and the first destination), and the second route may include a plurality of straight segments (the plurality of straight segments may connect the second start location and the second destination). The processor 220 (or the route similarity module 440) may calculate a portion vector of each straight segment. The vector of the first route may be a sum of the plurality of portion vectors corresponding to the first route, and the vector of the second route may be a sum vector of the plurality of portion vectors corresponding to the second route. The processor 220 (or the route similarity module 440) may calculate an angle the two vectors as the angle between the first route and the second route.

In 920, the processor 220 (or the route similarity module 440) may determine a distance difference between a carpooling route and a longer single route. In some embodiments, the longer single route may be a route with a longer distance between the first route and the second route.

In some embodiments, the processor 220 (or the route similarity module 440) may first calculate a carpooling distance of the carpooling route, and a longer single distance of the longer route. The distance difference may equal to a difference between the carpooling distance and the longer single distance. In some embodiments, the carpooling distance may refer to a straight distance or a driving distance from the first start location to the second start location to the first destination (or the second destination) to the second destination (or the first destination). The longer single distance may refer to a longer distance between a straight distance or a driving distance between the first start location and the first destination and a straight distance between the second start location and the second destination. The distance difference between the carpooling route and the longer single route may equal to a difference between the carpooling distance and the longer single distance.

In 930, the processor 220 (the route similarity module 440) may determine a route similarity between the first passenger terminal and the second passenger terminal based on the angle and the distance difference.

In some embodiments, the processor 220 (the route similarity module 440) may calculate the route similarity according to an algorithm and/or a formula associated with the angle and the distance difference. In some embodiments, the greater the angle is, the less the route similarity may be. The greater the distance difference is, the less the route similarity may be.

In some embodiments, the processor 220 (the route similarity module 440) may determine whether the angle is greater than an angle threshold and/or whether the distance difference is greater than a distance threshold. In response to determining that the angle is not greater than the angle threshold and/or the distance difference is not greater than the distance threshold, the processor 220 (the route similarity module 440) may determine that the route similarity is greater than the similarity threshold. In some embodiments, the angle threshold and/or the distance threshold may be predetermined and stored in a storage (e.g., the storage 130, the ROM 230, the RAM 240, etc.) of the system 100. In some embodiments, the angle threshold and/or the distance threshold may be determined according to different application scenarios (e.g., different routes). For example, the angle threshold may be within 0 and 30 degree, 0 and 15 degree, 0 and 10 degree, or the like, or any combination thereof. As another example, the distance threshold may be within 0 and 30 kilometers, 0 and 10 kilometers, or the like, or any combination thereof.

Figure 10:
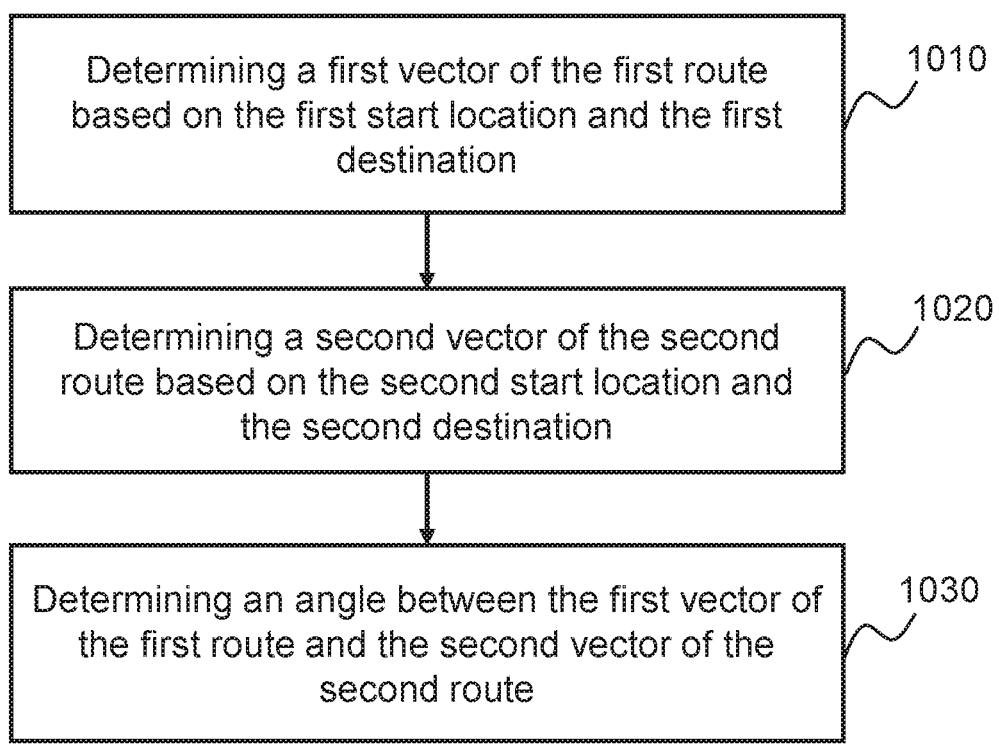
FIG. 10 is a flowchart illustrating an exemplary process and/or method for determining an angle between a first vector of a first route and a second vector of a second route according to some embodiments of the present disclose.

FIG. 10 is a flowchart of an exemplary process and/or method 1000 for determining a route similarity between a first passenger terminal and a second passenger terminal according to some embodiments of the present disclose. In some embodiments, one or more steps in the process 1000 may be implemented in the system 100 illustrated in FIG. 1. For example, one or more steps in the process 1000 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 1000 may be stored as at least one set of instructions in a non-transitory computer readable medium embodying a computer program product. In some embodiments, the instructions may be transmitted in a form of electronic current or electrical signals. The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, the processor 220 (the route similarity module 440) may determine a first vector of the first route based on the first start location and the first destination.

In some embodiments, the first vector may be a vector between the first start location and the first destination. In some embodiments, the first vector may be a first sum vector of a plurality of portion vector, each portion vector may refer to a vector of a straight segment associated with the first route from the first start location to the first destination.

In 1020, the processor 220 (the route similarity module 440) may determine a second vector of the second route based on the second start location and the second destination.

In some embodiments, the second vector may be a vector between the second start location and the second destination. In some embodiments, the second vector may be a second sum vector of a plurality of portion vector, each portion vector may refer to a vector of a straight segment associated with the second route from the second start location to the second destination.

In 1030, the processor 220 (the route similarity module 440) may determine an angle between the first vector of the first route and the second vector of the second route.

In some embodiments, the angle may be an angle between the first vector and the second vector. In some embodiments, the angle may be an angle between the first sum vector and the second sum vector. In some embodiments, the processor 220 (the route similarity module 440) may calculate the angle between the first route and the second route based on the magnitudes and the directions of the two vectors.

Figure 11:
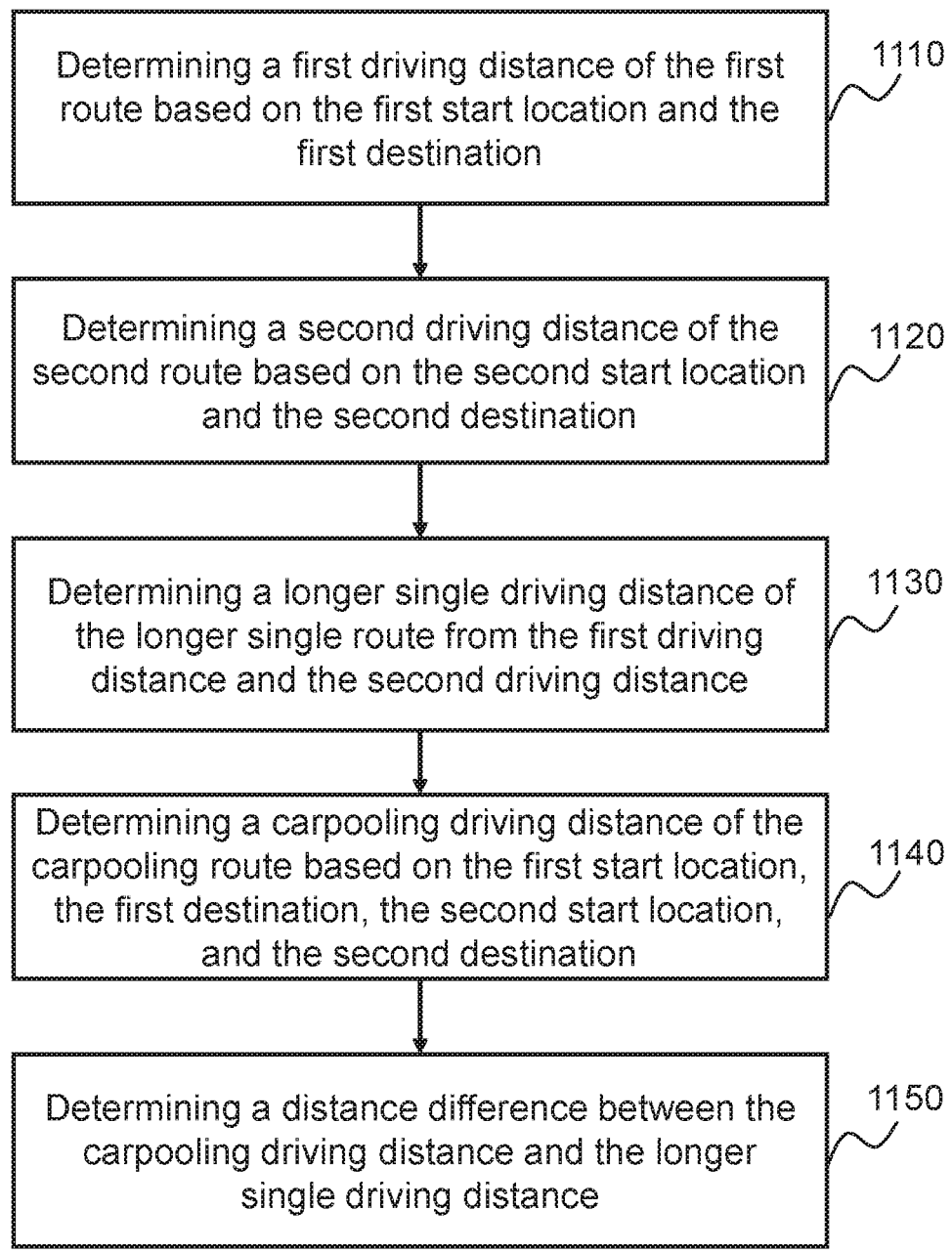
FIG. 11 is a flowchart illustrating an exemplary process and/or method for determining a distance difference between a carpooling driving distance and a longer single driving distance according to some embodiments of the present disclose.

FIG. 11 is a flowchart of an exemplary process and/or method 1100 for determining a route similarity between a first passenger terminal and a second passenger terminal according to some embodiments of the present disclose. In some embodiments, one or more steps in the process 1100 may be implemented in the system 100 illustrated in FIG. 1. For example, one or more steps in the process 1100 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 1100 may be stored as at least one set of instructions in a non-transitory computer readable medium embodying a computer program product. In some embodiments, the instructions may be transmitted in a form of electronic current or electrical signals. The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1110, the processor 220 (the route similarity module 440) may determine a first driving distance of the first route based on the first start location and the first destination.

In some embodiments, the first driving distance of the first route may refer to a distance that a driver may drive from the first start location to the first destination. In some embodiments, there may be at least one first driving path from the first start location to the first destination. The first driving distance may be a shortest driving distance of the at least one first driving path.

In 1120, the processor 220 (the route similarity module 440) may determine a second driving distance of the second route based on the second start location and the second destination.

In some embodiments, the second driving distance of the second route may refer to a distance that a driver may drive from the second start location to the second destination. In some embodiments, there may be at least one second driving path from the second start location to the second destination. The second driving distance may be a shortest driving distance of the at least one second driving path.

In 1130, the processor 220 (the route similarity module 440) may determine a longer single driving distance of the longer single route from the first driving distance and the second driving distance. In some embodiments, the processor 220 (the route similarity module 440) may compare the first driving distance and the second driving distance, between which the longer one may refer to the longer single driving distance.

In 1140, the processor 220 (the route similarity module 440) may determine a carpooling driving distance of the carpooling route based on the first start location, the first destination, the second start location, and the second destination.

In some embodiments, the carpooling driving distance may refer to a distance that a driver may drive by passing by the first start location, the first destination, the second start location, and the second destination. In some embodiments, there may be at least one carpooling path by passing by the four locations (e.g., the first start location, the first destination, the second start location, and the second destination). The carpooling driving distance may a shortest distance of the at least one carpooling path.

In 1150, the processor 220 (the route similarity module 440) may determine a distance difference between the carpooling driving distance and the longer single driving distance. In some embodiments, the distance difference may be a distance that equals to the carpooling driving distance subtracting the longer single driving distance.

Figure 12:
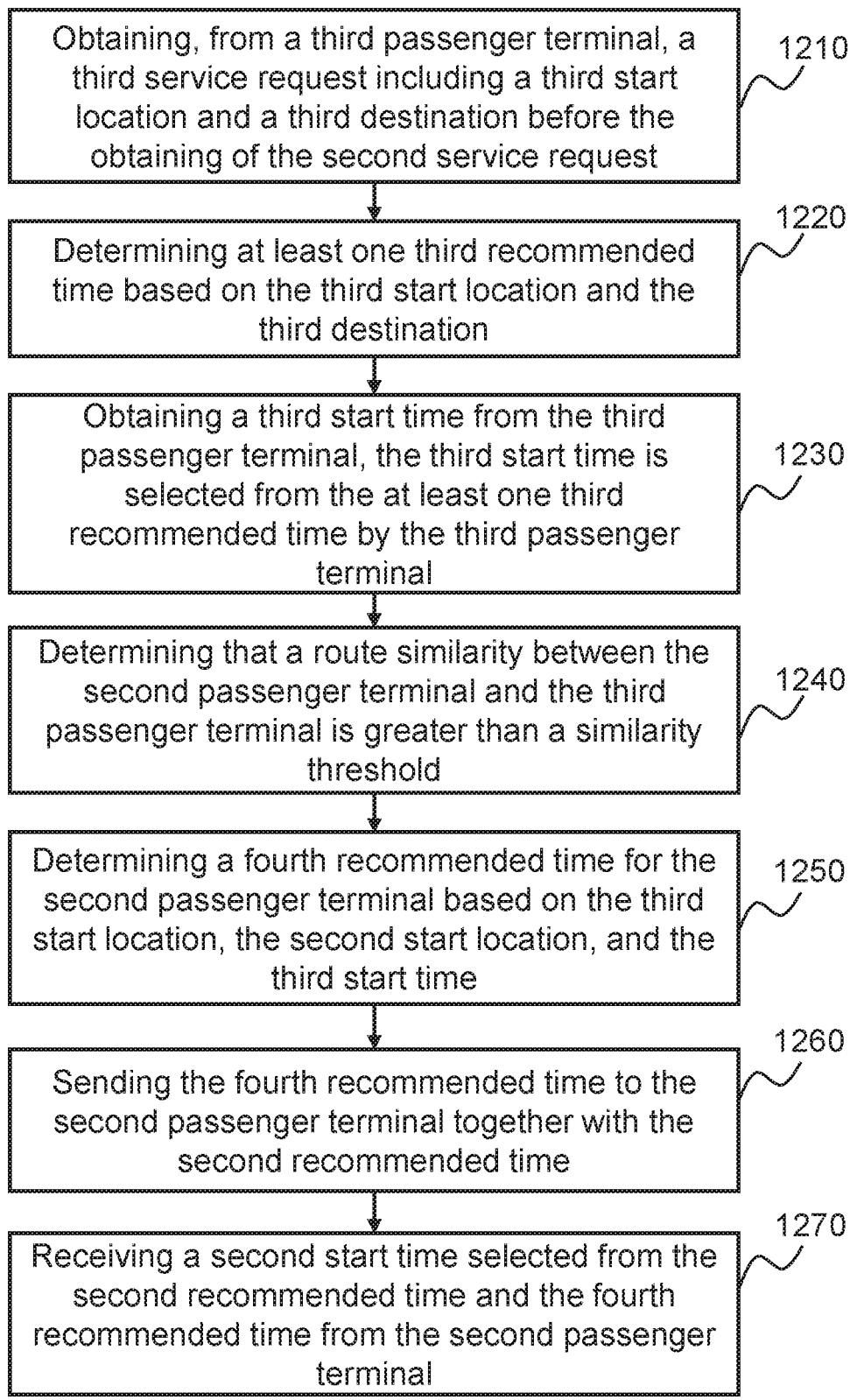
FIG. 12 is a flowchart illustrating an exemplary process and/or method for reserving a carpooling service according to some embodiments of the present disclose.

FIG. 12 is a flowchart of an exemplary process and/or method 1200 for reserving a carpooling service and a second passenger terminal according to some embodiments of the present disclose. In some embodiments, one or more steps in the process 1200 may be implemented in the system 100 illustrated in FIG. 1. For example, one or more steps in the process 1200 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110). In some embodiments, one or more steps in the process 1200 may be stored as at least one set of instructions in a non-transitory computer readable medium embodying a computer program product. In some embodiments, the instructions may be transmitted in a form of electronic current or electrical signals. The operations of the illustrated process 1200 presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In some embodiments, the processor 220 may implement the process and/or method 1200 together with the process and/or method 500 in FIG. 5 of the present disclosure for reserving a carpooling service. In 1210, the processor 220 (or the communication module 410) may obtain a third service request from a third passenger terminal before the obtaining of the second service request (or after obtaining a first start time from the first passenger terminal). In some embodiments, the third service request may include a third start location, a third destination, a third user identifier of the third passenger terminal, a third request time, a third position where the third passenger terminal sends the third service request, a vehicle type that the third passenger terminal requests, or the like, or any combination thereof.

In some embodiments, the third passenger terminal may be used by an earlier passenger (also refers to as a third passenger) who inputs his/her start location and destination earlier than the second passenger to request for a carpooling service associated with his/her start location and destination (e.g., the routes and/or driving paths are same or similar so that the third passenger and the second passenger may share a vehicle together). The third service request may refer to the corresponding carpooling request from the third passenger terminal, and the third start location and the third destination may refer to the corresponding start location and destination in the third service request, respectively. In some embodiments, the third passenger terminal may request for a carpooling service earlier than the first passenger terminal. In some embodiments, the third passenger terminal may request for a carpooling service later than the first passenger terminal. In some embodiments, the third passenger terminal may refer to a plurality of passenger terminals that request for carpooling services earlier than the second passenger terminal, and may share a vehicle together with the second passenger terminal.

In 1220, the processor 220 (or the third recommended time module 450) may determine at least one third recommended time based on the third start location and the third destination. In some embodiments, the process and/or method for determining the at least one third recommended time may be same or similar with the process and/or method for determining the at least one first recommended time in FIG. 5 in the present disclosure. In some embodiments, the process and/or method for determining the at least one third recommended time may be found in connection with FIG. 6 and the description thereof in the present disclosure.

In 1230, the processor 220 (or the communication module 410) may obtain a third start time from the third passenger terminal. The third start time is selected from the at least one third recommended time by the third passenger terminal.

In some embodiments, after determining the at least third recommended time, the processor 220 (or the communication module 410) may send the at least one third recommended time to the third passenger terminal via the network 150, then the third passenger of the third passenger terminal may select the third start time from the at least third recommended time as his/her start time for starting the carpooling service. The third passenger terminal may then receive the selection, and send the third start time to the processor 220 (or the communication module 410) via the network 150.

In 1240, the processor 220 (or the route similarity module 440) may determine that a route similarity between the second passenger terminal and the third passenger terminal is greater than a similarity threshold. In some embodiments, the process and/or method for determining the route similarity between the second passenger terminal and the third passenger terminal is greater than a similarity threshold may be found same or similar in connection with FIG. 8-11 and the descriptions thereof in the present disclosure.

In 1250, the processor 220 (or the fourth recommended time module 460) may determine a fourth recommended time for the second passenger terminal based on the third start location, the second start location, and the third start time.

In some embodiments, the processor 220 (or the fourth recommended time module 460) may first calculate an estimated driving time from the third start location to the second start location, and then calculate a time after the estimated driving time from the third start time.

In 1260, the processor 220 (or the communication module 410) may send the fourth recommended time to the second passenger terminal together with the second recommended time.

In some embodiments, the fourth recommended time and the second recommended time may correspond to a passenger terminal that requests a carpooling service earlier than the second passenger terminal and may share a vehicle with the second passenger terminal together, respectively. It should be noted that, the second passenger terminal that later requests a carpooling service may receive a plurality of recommended time, each recommended time may correspond to a passenger terminal that requests a carpooling service earlier than the second passenger terminal.

In some embodiments, the second passenger may receive the fourth recommended time and the second recommended time, select one of the two time as his/her start time (also refers to as second start time), and send the second start time to the server 110 via the network 150.

In 1270, the processor 220 (or the communication module 410) may receive a second start time selected from the second recommended time and the fourth recommended time from the second passenger terminal.

In some embodiments, after receiving the second start time, the processor 220 may generate a carpooling order, and send the carpooling order to one of the first passenger terminal and the third passenger terminal, the second passenger terminal, and a driver terminal that registered in the online transportation platform before the carpooling service begins.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for reserving a carpooling service, comprising:
    at least one storage medium including a set of instructions for reserving a carpooling service; and
    at least one processor in communication with the storage medium, wherein when executing the set of instructions, the at least one processor is directed to:
        obtain, from a first passenger terminal, a first service request including a first start location and a first destination;
        determine at least one first recommended time based on the first start location and the first destination;
        obtain a first start time from the first passenger terminal, wherein the first start time is selected from the at least one first recommended time by the first passenger terminal;
        obtain, from a second passenger terminal, a second service request including a second start location and a second destination after the obtaining of the first service request; and
        determine a second recommended time for the second passenger terminal based on the first start location, the second start location, and the first start time, wherein the first passenger carpools with the second passenger, the first passenger departs at the first start time, and the second passenger departs at the second recommended time.

2. The system of claim 1, wherein to determine the at least one first recommended time based on the first start location and the first destination, the at least one processor is further directed to:
    obtain a plurality of historical orders;
    identify a plurality of routes from the plurality of historical orders, wherein each route includes a start location and a destination;
    for each route, determine a count of historical orders during each predetermined period of time; and
    for each route, determine at least one first recommended time based on the count of historical orders during each predetermined period of time.

3. The system of claim 1, wherein to determine the second recommended time for the second passenger terminal, the at least one processor is further directed to:
    determine an estimated driving time from the first start location to the second start location; and
    determine the second recommended time based on the first start time and the estimated driving time.

4. The system of claim 1, wherein to determine the second recommended time for the second passenger terminal, the at least one processor is further directed to:
    determine a first route similarity between the first passenger terminal and the second passenger terminal;
    determine that the first route similarity is greater than a first similarity threshold; and
    determine the second recommended time based on the first start location, the second start location, and the first start time.

5. The system of claim 4, wherein to determine the route similarity between the first passenger terminal and the second passenger terminal, the at least one processor is further directed to:
    determine an angle between a first route of the first passenger terminal and a second route of the second passenger terminal;
    determine a distance difference between a carpooling route and a longer single route, wherein the longer single route is a route with a longer distance between the first route and the second route; and determine the route similarity between the first passenger terminal and the second passenger terminal based on the angle and the distance difference.

6. The system of claim 5, wherein to determine the angle between the first route and the second route, the at least one processor is further directed to:
determine a first vector of the first route based on the first start location and the first destination;
determine a second vector of the second route based on the second start location and the second destination; and
determine an angle between the first vector of the first route and the second vector of the second route.

7. The system of claim 5, wherein to determine the distance difference between the carpooling route and the longer single route, the at least one processor is further directed to:
determine a first driving distance of the first route based on the first start location and the first destination;
determine a second driving distance of the second route based on the second start location and the second destination;
determine a longer single driving distance of the longer single route from the first driving distance and the second driving distance;
determine a carpooling driving distance of the carpooling route based on the first start location, the first destination, the second start location, and the second destination; and
determine a distance difference between the carpooling driving distance and the longer single driving distance.

8. The system of claim 1, wherein the at least one processor is further directed to:
obtain, from a third passenger terminal, a third service request including a third start location and a third destination before the obtaining of the second service request;
determine at least one third recommended time based on the third start location and the third destination;
obtain a third start time from the third passenger terminal, wherein the third start time is selected from the at least one third recommended time by the third passenger terminal;
determine that a second route similarity between the second passenger terminal and the third passenger terminal is greater than a second similarity threshold;
determine a fourth recommended time for the second passenger terminal based on the third start location, the second start location, and the third start time;
send the fourth recommended time to the second passenger terminal together with the second recommended time; and
receive a second start time selected from the second recommended time and the fourth recommended time from the second passenger terminal.

9. A method for reserving a carpooling service implemented on a computing device having at least one processor, at least one storage medium, and a communication platform connected to a network, comprising:
obtaining, from a first passenger terminal, a first service request including a first start location and a first destination;
determining at least one first recommended time based on the first start location and the first destination;
obtaining a first start time from the first passenger terminal, wherein the first start time is selected from the at least one first recommended time by the first passenger terminal;
obtaining, from a second passenger terminal, a second service request including a second start location and a second destination after the obtaining of the first service request; and
determining a second recommended time for the second passenger terminal based on the first start location, the second start location, and the first start time, wherein the first passenger carpools with the second passenger, the first passenger departs at the first start time, and the second passenger departs at the second recommended time.

10. The method of claim 9, wherein the determining the at least one first recommended time based on the first start location and the first destination includes:
obtaining a plurality of historical orders;
identifying a plurality of routes from the plurality of historical orders, wherein each route includes a start location and a destination;
for each route, determining a count of historical orders during each predetermined period of time; and
for each route, determining at least one first recommended time based on the count of historical orders during each predetermined period of time.

11. The method of claim 9, wherein determining the second recommended time for the second passenger terminal includes:
determining an estimated driving time from the first start location to the second start location; and
determining the second recommended time based on the first start time and the estimated driving time.

12. The method of claim 9, wherein the determining the second recommended time for the second passenger terminal includes:
determining a first route similarity between the first passenger terminal and the second passenger terminal;
determining that the first route similarity is greater than a first similarity threshold; and
determining the second recommended time based on the first start location, the second start location, and the first start time.

13. The method of claim 12, wherein the determining the route similarity between the first passenger terminal and the second passenger terminal includes:
determining an angle between a first route of the first passenger terminal and a second route of the second passenger terminal;
determining a distance difference between a carpooling route and a longer single route, wherein the longer single route is a route with a longer distance between the first route and the second route; and
determining the route similarity between the first passenger terminal and the second passenger terminal based on the angle and the distance difference.

14. The method of claim 13, wherein the determining the angle between the first route and the second route includes:
determining a first vector of the first route based on the first start location and the first destination;
determining a second vector of the second route based on the second start location and the second destination; and
determining an angle between the first vector of the first route and the second vector of the second route.

15. The method of claim 13, wherein the determining the distance difference between the carpooling route and the longer single route includes:
- determining a first driving distance of the first route based on the first start location and the first destination;
- determining a second driving distance of the second route based on the second start location and the second destination;
- determining a longer single driving distance of the longer single route from the first driving distance and the second driving distance;
- determining a carpooling driving distance of the carpooling route based on the first start location, the first destination, the second start location, and the second destination; and
- determining a distance difference between the carpooling driving distance and the longer single driving distance.

16. The method of claim 9 further comprising:
- obtaining, from a third passenger terminal, a third service request including a third start location and a third destination before the obtaining of the second service request;
- determining at least one third recommended time based on the third start location and the third destination;
- obtaining a third start time from the third passenger terminal, wherein the third start time is selected from the at least one third recommended time by the third passenger terminal;
- determining that a second route similarity between the second passenger terminal and the third passenger terminal is greater than a second similarity threshold;
- determining a fourth recommended time for the second passenger terminal based on the third start location, the second start location, and the third start time;
- sending the fourth recommended time to the second passenger terminal together with the second recommended time; and
- receiving a second start time selected from the second recommended time and the fourth recommended time from the second passenger terminal.

17. A non-transitory computer readable medium, comprising at least one set of instructions for reserving a carpooling service, wherein when executed by at least one processor of a computer device, the at least one set of instructions directs the at least one processor to:
- obtain, from a first passenger terminal, a first service request including a first start location and a first destination;
- determine at least one first recommended time based on the first start location and the first destination;
- obtain a first start time from the first passenger terminal, wherein the first start time is selected from the at least one first recommended time by the first passenger terminal;
- obtain, from a second passenger terminal, a second service request including a second start location and a second destination after the obtaining of the first service request; and
- determine a second recommended time for the second passenger terminal based on the first start location, the second start location, and the first start time, wherein the first passenger carpools with the second passenger, the first passenger departs at the first start time, and the second passenger departs at the second recommended time.

18. The non-transitory computer readable medium of claim 17, wherein to determine the at least one first recommended time based on the first start location and the first destination, the at least one set of instructions further directs the at least one processor to:
- obtain a plurality of historical orders;
- identify a plurality of routes from the plurality of historical orders, wherein each route includes a start location and a destination;
- for each route, determine a count of historical orders during each predetermined period of time; and
- for each route, determine at least one first recommended time based on the count of historical orders during each predetermined period of time.

19. The non-transitory computer readable medium of claim 17, wherein to the second recommended time for the second passenger terminal, the at least one set of instructions further directs the at least one processor to:
- determine a first route similarity between the first passenger terminal and the second passenger terminal;
- determine that the first route similarity is greater than a first similarity threshold; and
- determine the second recommended time based on the first start location, the second start location, and the first start time.

20. The non-transitory computer readable medium of claim 17, wherein the at least one set of instructions further directs the at least one processor to:
- obtain, from a third passenger terminal, a third service request including a third start location and a third destination before the obtaining of the second service request;
- determine at least one third recommended time based on the third start location and the third destination;
- obtain a third start time from the third passenger terminal, wherein the third start time is selected from the at least one third recommended time by the third passenger terminal;
- determine that a second route similarity between the second passenger terminal and the third passenger terminal is greater than a second similarity threshold;
- determine a fourth recommended time for the second passenger terminal based on the third start location, the second start location, and the third start time;
- send the fourth recommended time to the second passenger terminal together with the second recommended time; and
- receive a second start time selected from the second recommended time and the fourth recommended time from the second passenger terminal.

* * * * *